United States Patent [19]

Raz

[11] Patent Number: 5,949,907
[45] Date of Patent: Sep. 7, 1999

[54] WINDOW TEXTURE EXTRACTION FOR IMAGE ANALYSIS

[75] Inventor: Ryan S Raz, Toronto, Canada

[73] Assignee: Morphometrix Technologies Inc., Toronto, Canada

[21] Appl. No.: 09/009,274

[22] Filed: Jan. 20, 1998

Related U.S. Application Data

[63] Continuation of application No. PCT/CA96/00478, Jul. 18, 1996
[60] Provisional application No. 60/001,216, Jul. 19, 1995.

[51] Int. Cl.$^6$ .................................................. G06K 9/56
[52] U.S. Cl. ............................. 382/205; 382/168; 382/266
[58] Field of Search ........................... 382/108, 128, 382/168, 170, 205, 224, 266, 270

[56] References Cited

U.S. PATENT DOCUMENTS

| | | | |
|---|---|---|---|
| 5,633,948 | 5/1997 | Kegelmeyer, Jr. | 382/133 |
| 5,757,953 | 5/1998 | Jang | 382/173 |
| 5,768,333 | 6/1998 | Abdel-Mottaleb | 378/37 |

FOREIGN PATENT DOCUMENTS

| | | | |
|---|---|---|---|
| 0 653 726 | 5/1995 | European Pat. Off. | G06T 5/40 |

OTHER PUBLICATIONS

Proceedings IEEE Southeastcon '92, vol. 1, Apr. 12–15, 1992, New York, N.Y., USA pp. 20–22, XP000338676 Kanitkar & Dudgeon: "A Walsh Transform–Neural Network Method for Estimating the Size Distribution of Bubbles in a Liquid".

IEEE International Conference on Acoustics, Speech and Signal Processing, Apr. 27–30, 1993, New York, N.Y., USA, pp. V–21–V–24, XP000437613 Chen and Kundu: "Automatic Unsupervised Texture Segmentation Using Hidden Markov Model".

*Primary Examiner*—Phuoc Tran
*Attorney, Agent, or Firm*—Ridout & Maybee

[57] ABSTRACT

A window texture extraction process for quantifying texture features in grey-level images and combining the quantified texture features with previously derived classification results. The previously determined classification results require that all of the training data and all the target data be assigned, or be capable of being assigned to one of two classes. The result is a set of new features that can be quickly analyzed to determine such properties as class membership for identification purposes. In order to fold-in the classification results, the class membership is established in previous experiments on images which have been characterized. The previous experiments are executed through the application of a window texture extraction kernel according to the invention.

10 Claims, 10 Drawing Sheets

WINDOW TEXTURE EXTRACTION FOR IMAGE ANALYSIS

This application is a continuation of our co-pending International Patent Application No. PCT/CA96/00478 filed Jul. 18, 1996, provisional application No. 60/001,216 Jul. 19, 1995.

FIELD OF THE INVENTION

The present invention relates to automated diagnostic techniques in medicine and biology, and more particularly to a window texture extraction method suitable for automated analysis of visual characteristics in digitized images for biological specimens.

BACKGROUND OF THE INVENTION

In the fields of medicine and biology, there is a wide range of diagnostic techniques based on the analysis of visual characteristics. In recent years the trend has been to automate the diagnostic techniques. In order to successfully automate such techniques, computational tools must be available to efficiently quantify the visual attributes of objects found in the digitized images or the biological specimens.

One example of such an analysis technique is the quantitative analysis of visual texture. There exist several automated or semi-automated diagnostic instruments for the pre-screening of gynaecological smears. The object of these pre-screening instruments is to attempt an identification of cervical epithelial cells which exhibit cancerous or precancerous attributes. The pre-screening procedure involves assessing the state of genetic activity of any cell and more particularly the distribution of the genetic material within its nucleus. The physical distribution of the genetic material in the nucleus is commonly known as chromatin (FIG. 1), and manifests itself as a visual texture in a digitized micrograph. Thus, the ability to accurately analyze the nuclear texture is a vital step in the rendering of an automated diagnostic decision.

The calculation of a texture feature, i.e. nuclear texture, generally relies on an analysis of the distribution of the digitized pixel intensities within the digital image. In the art, there are four principal approaches to optical texture analysis that yield quantitative parameters. The first approach is known as "Markovian" analysis. According to the Markovian analysis technique, the digitized image is treated as a form of stochastic process carrying the image into a transition-probability space. The second approach comprises "gradient analysis" where the grey-scale image is treated as a scalar and differentiable function with texture parameters based on the direction and rate of spatial variations. The third approach comprises a "granulometric" analysis. The granulometric technique analyzes textures by characterizing blocks of the image according to size, shape, grey-level content and distribution. The fourth commonly used approach comprises "orthogonal transformation" analysis. The orthogonal transformation analysis technique essentially involves a mapping of the image into some sort of orthogonal space, for example a Fourier space, where the expansion coefficients can be used to characterize the image texture.

While the commonly known texture feature analysis techniques briefly described above are suitable for analyzing nuclear texture, implementation of the techniques into an automated instrument presents significant obstacles. The primary obstacle is the requirement for substantial computational power due to the calculation-intensive nature of the analysis techniques.

What is required is a method which integrates the aspects of these analysis techniques into a process which can be implemented and executed in an automated diagnostic decision making instrument.

BRIEF SUMMARY OF THE INVENTION

The present invention provides a method for performing window texture extraction suitable for an automated computational instrument for diagnostic analysis.

The method according to the present invention is optimized for the extraction of a reduced set of texture features based on a combination of granulometric and gradient operations. It is a feature of the present invention that the otherwise enormous parameter space of texture features is reduced to five measures. This is accomplished by the application of a classification mask to the data. In this respect, the window texture extraction method produces texture parameters which are in a sense convoluted by the class divisions recognized by the classification architecture. Thus, the window texture extraction method performs as a computationally efficient bridging operation between the extraction of features and the classification of objects.

In a first aspect the present invention provides a window texture extraction method for analyzing images of specimens, said method comprising the steps of: (a) applying a window texture extraction kernel to said image to identify binary patterns in said image; (b) associating each of said binary patterns with a predetermined category; (c) constructing a histogram from said predetermined categories; (d) utilizing said histogram to evaluate said image.

In another aspect, the present invention provides a window texture extraction method for identifying patterns in a digitized image, said window texture extraction method comprising the steps of: (a) applying an edge-enhancement operation to said image to emphasize selected structures in said digitized image and produce an enhanced image; (b) applying a local threshold operation to said edge-enhanced image to generate a binary image wherein said pixels have an ON value or an OFF value; (c) dividing said binary image into a plurality of sub-units and each of said sub-units comprising a predetermined number of binary pixels; (d) converting the binary pixels in each of said sub-units into a numerical identifier wherein said numerical identifier represents a binary pattern formed by said binary pixels in the sub-unit.

A preferred embodiment of the present invention will now be described by way of example, with reference to the following specification, claims, and drawings.

DETAILED DESCRIPTION OF THE PREFERRED EMBODIMENT

Figure 1:
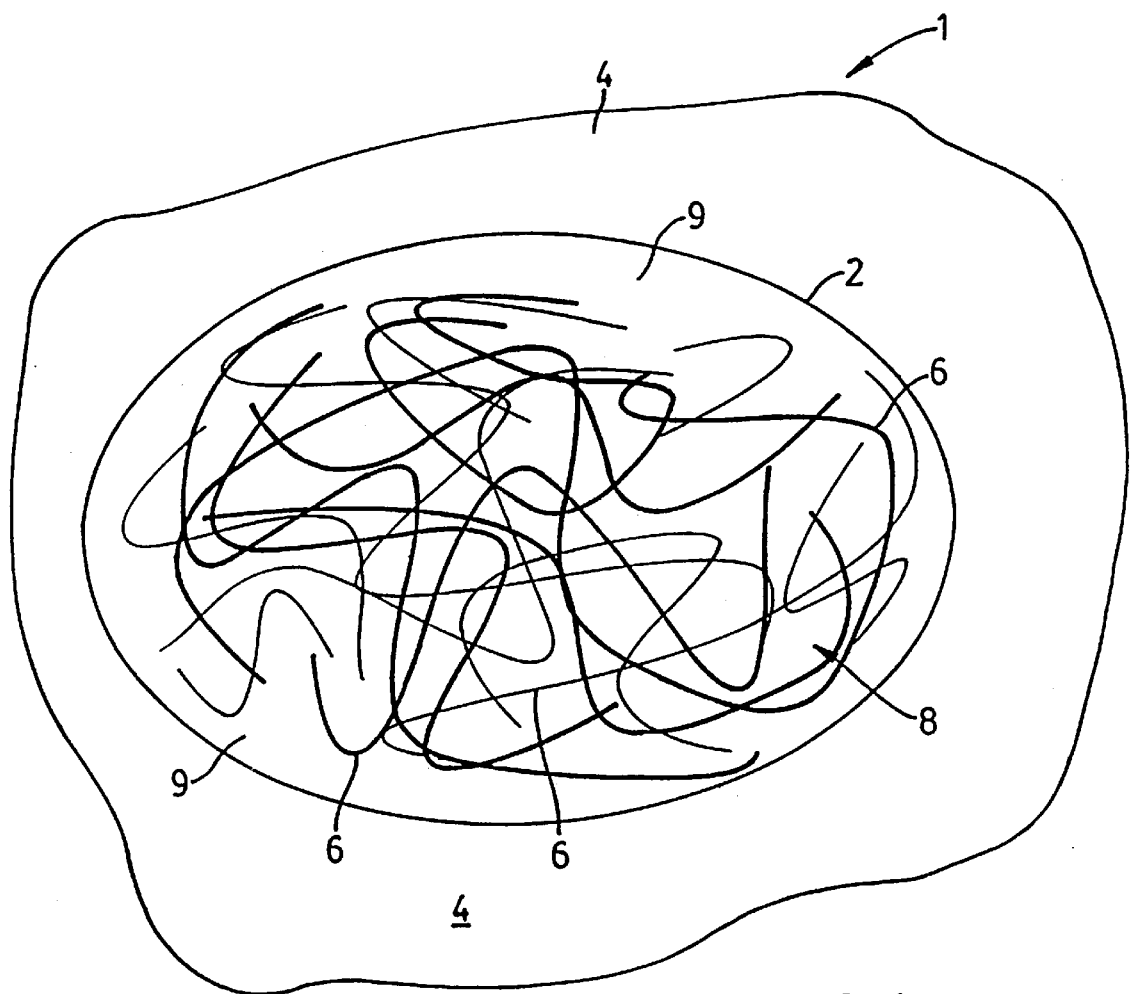
FIG. 1 shows in diagrammatic form a nuclear texture with chromatin strands.

A cell 1 comprises a nucleus 2 and a cytoplasm region 4 as illustrated in FIG. 1. The nucleus 2 contains genetic material in the form of chromatin. The chromatin is composed of numerous fibres approximately 15 to 25 nm (nanometers) in diameter. The chromatin fibres are too small to be resolved with light microscopy, however, the fibres tend to join together to form larger structures or strands 6 in the cell nucleus 2 as shown in FIG. 1. In the nucleus 2, the strands 6 tend to form an arrangement or physical distribution 8 which manifests itself as a visual texture in a digitized micrograph. The window texture extraction process regards the arrangements 8 of the chromatin strands 6 within the cell nucleus 2 as the source of "nuclear texture". For "clusters" of cells, the visual (or nuclear) texture is considered to be an amalgam of the chromatin distribution 8 within the cell and the arrangement of cellular boundaries (e.g. cytoplasm regions) that define the individual cells in the cluster.

As will now be described, the present invention provides a window texture extraction method which comprises a process for ascertaining the texture of a cell or cell clusters by analyzing digitized images of the cell, and more specifically the distribution of digitized pixel intensities within the image. The window texture extraction method according to the present invention is based on the principle that the visual texture of the nucleus 2 can be precisely quantified by noting the distribution of the larger-scale arrangements 8 of the longer strands 6 of chromatin fibres, and to a lesser degree the arrangement of the cellular boundaries within larger cell clusters.

Figure 2:
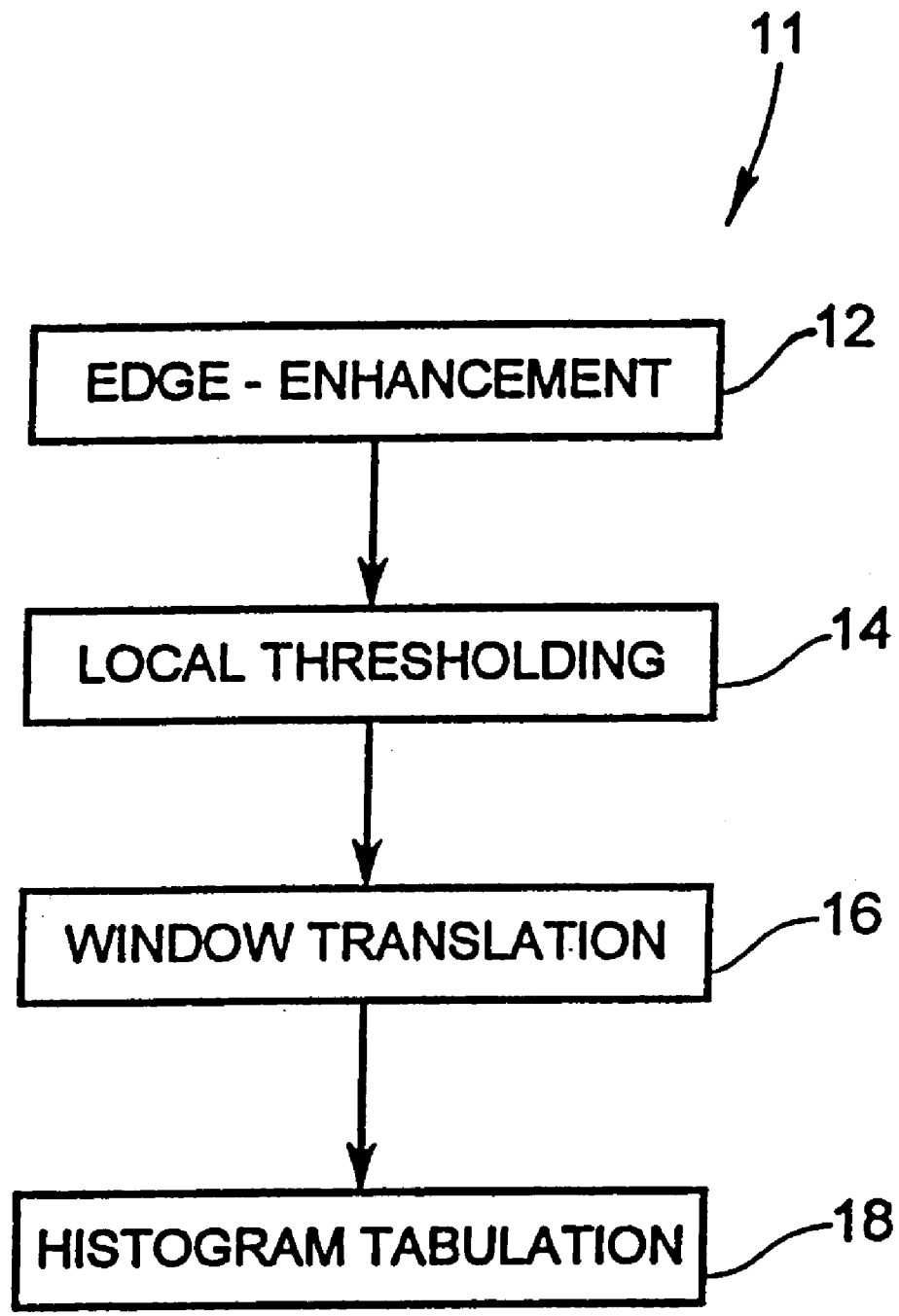
FIG. 2 shows the principal functional modules of a window texture extraction kernel according to the present invention.
Figure 3:
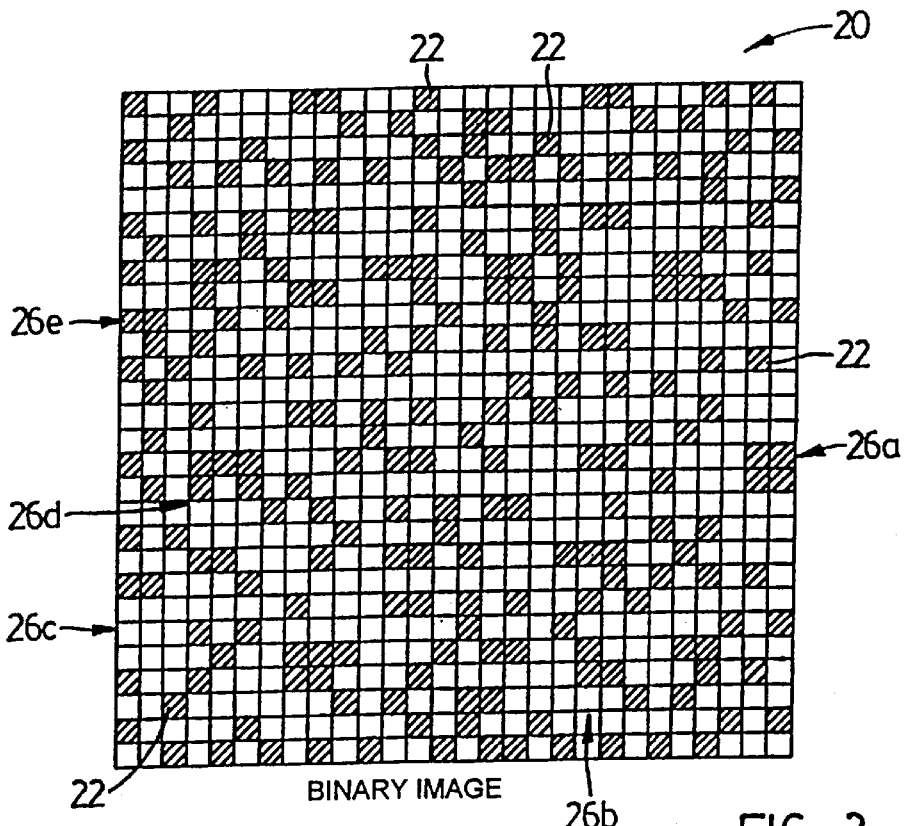
FIG. 3 shows in diagrammatic form a digitized or binary image.

The window texture extraction method 10 (FIG. 14) according to the present invention comprises a window texture extraction kernel 11 as shown in FIG. 2. The window texture extraction (WTE) kernel 11 comprises a routine or process which operates on grey-level digitized images of nuclear material and generates a binary map (as shown in FIG. 3) in which dark pixels represent the chromatin strand arrangement 8 (FIG. 1). The grey-level digitized images of the nuclear material, i.e. cell clusters, comprise standard, for example, 512 scan line, digital images and are generated using conventional digitizing cameras and techniques.

Referring to FIG. 2, the window texture extraction kernel 11 comprises four principal processes or modules: an edge-enhancement module 12, a local threshold module 14, a window translation module 16 and a histogram tabulation module 18. It has been found that application of edge-enhancement, smoothing and local threshold image processing operations emphasizes the distribution of chromatin strands and cellular boundaries in the cell clusters.

The edge-enhancement module 12 treats the chromatin strands 6 (FIG. 1) as a series of sharp edges within the nucleus 2 (FIG. 1) to be brought out in the digitized image using gradient calculations. Since the chromatin strands 6 within the cellular boundaries are dark lines on a grey background, the edge-enhancement operation 12 will preferentially emphasize these structures in the resulting "edge-enhanced" grey-level image. The cellular boundaries outside the cell, i.e. in cell clusters, are treated in the same manner. The next step in the process involves a smoothing operation. In the case of isolated cell nuclei, the image is merely smoothed to eliminate spurious noise before binarization.

Figure 5:
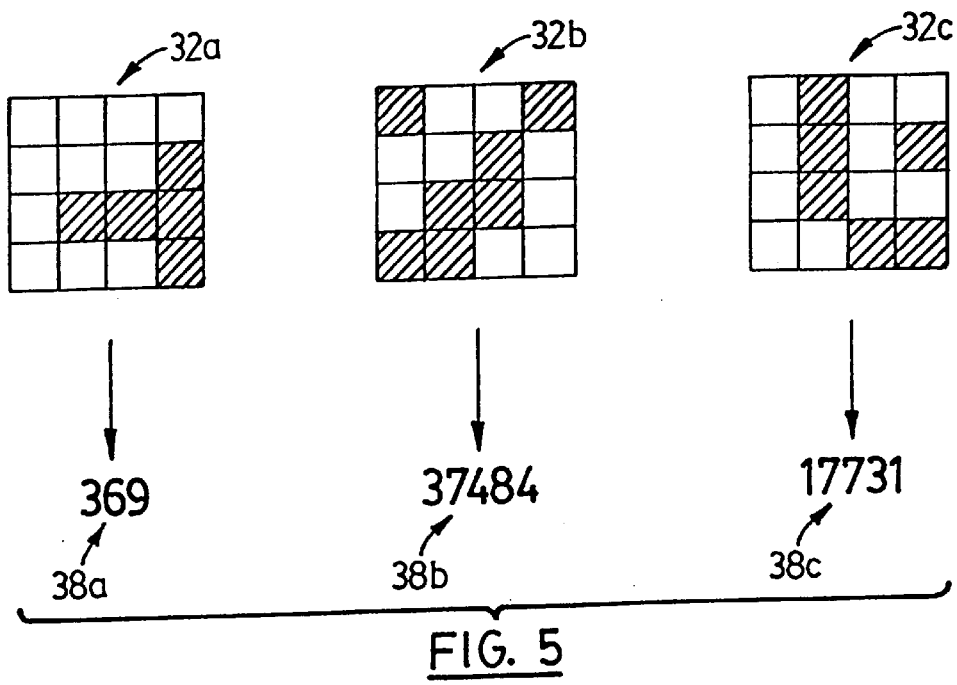
FIG. 5 shows three possible binary patterns created from a binary image along with their decimal number equivalents.

Referring to FIG. 5, the next operation in the window texture extraction kernel 11 is performed by the local threshold module 14. The threshold module 14 applies a threshold operation to the reduce the edge-enhanced grey-level image to a binary image 20 as depicted in FIG. 3. The threshold procedure 14 operates by fixing a grey-level above which all pixels in the grey-level image will be rendered "bright" and below which all pixels will be rendered "dark". The threshold is locally-adapted and relies on the statistical distribution of pixel intensities within the image to determine the appropriate threshold level. As shown in FIG. 3, the binary image 20 comprises dark pixels 22 and light pixels 24, where the dark pixels 22 represent chromatin strands 8 (as depicted in FIG. 1), and the light pixels 24 represent the background 9 of the nucleus 2 (FIG. 1). The binary image 20 is binary in the sense that consists of only two light intensity levels: light and dark.

Referring to FIG. 3, the arrangement of the chromatin strands are expressed as dark regions 26 in the binary map 20. In FIG. 3, exemplary dark regions 26 are indicated individually as 26a, 26b, 26c, 26d and 26e. The dark regions 26 are regarded as a variety of binary patterns. The binary patterns are in turn expressed as numbers so as to translate the visual appearance of the chromatin strands 6 (FIG. 1) into mathematical objects for further processing, e.g. comparison and tabulation.

The window translation module 16 provides the analysis of the binary patterns or dark regions 26 which form the binary image 20 (FIG. 3). To effectively analyze the binary patterns 26, the window translation module 16 applies a "texture window" which breaks the binary image 20 into convenient sub-units for further processing.

Figure 4:
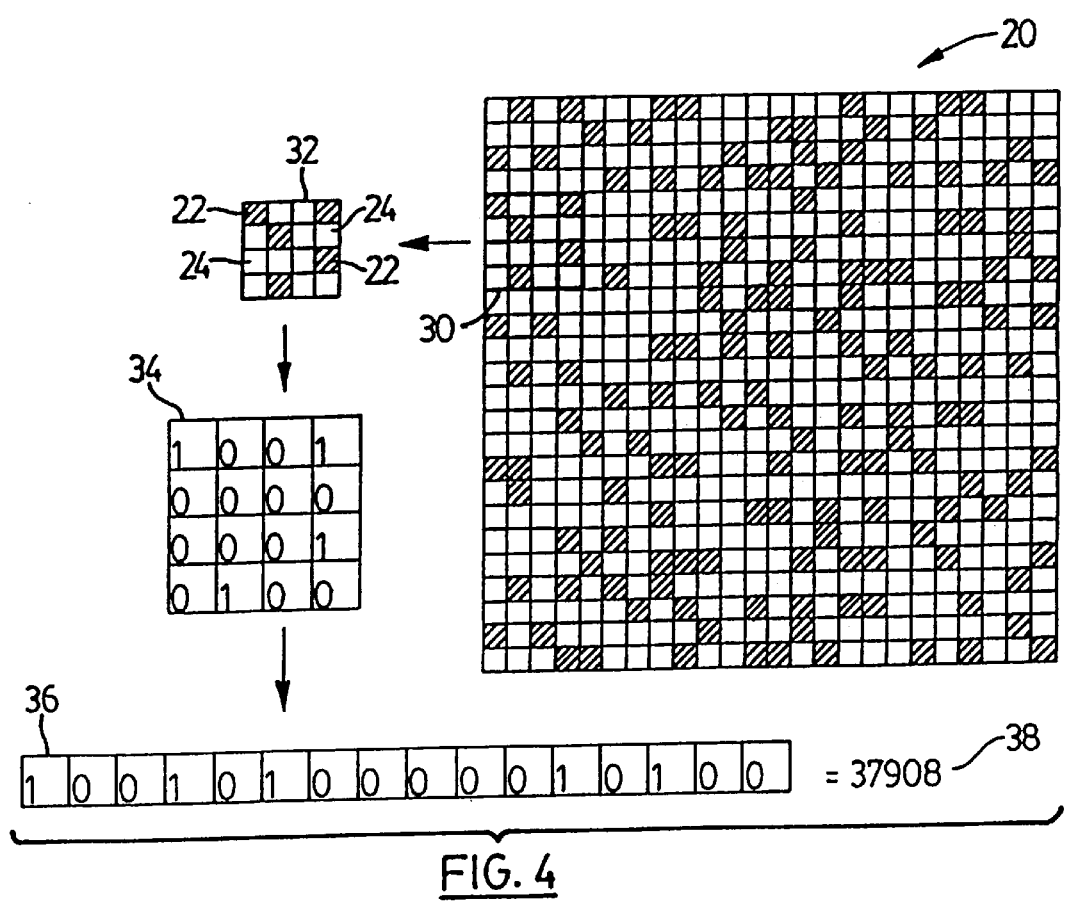
FIG. 4 shows in diagrammatic form the operation of creating binary patterns according to the present invention.

Referring to FIG. 4, the binary image 20 expresses the texture imparted by the chromatin strands as a pattern of light (24) and dark (22) pixels. The window module 16 applies a texture window 30 to the binary image 20 and to select a group of pixels comprising dark 22 and light 24 pixels. The light and dark pixels 22, 24 within the window form a binary pattern 32. The light and dark pixels 22, 24 comprising the binary pattern 32 are interpreted as binary numbers, "0" and "1", as shown at 34. The entire window 30 is then considered as a large binary number 36 whose size is related to the number of pixels contained in the window 30 as shown in FIG. 4. The binary number 36 is also given a decimal number equivalent 38. Three exemplary binary patterns 32a, 32b and 32c and their decimal number equivalents 38a, 38b and 38c are shown in FIG. 5.

Figure 6:
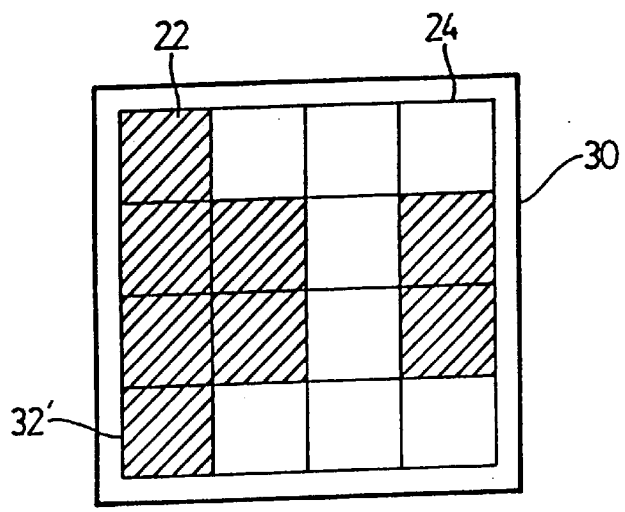
FIG. 6 shows a texture window and the corresponding binary number interpretation according to the present method.
Figure 6:
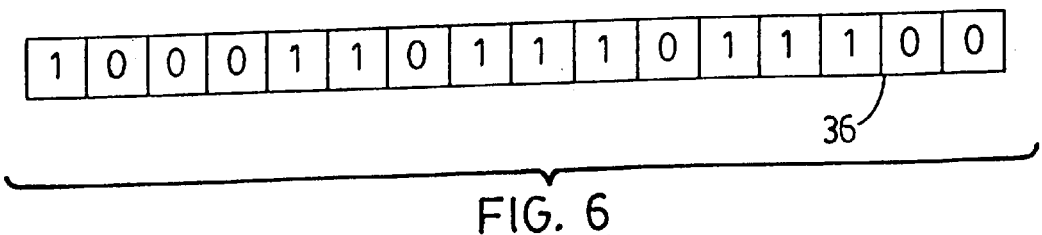

The window 30 may be of any size. However, there will be a balance to be achieved between the number of binary patterns 32 that may theoretically occur in the window 30 and the size of the numbers (e.g. binary number 36 or decimal number equivalent 38) that must be used to uniquely describe each binary pattern 32. In the present embodiment, the window 30 measures 4×4 pixels as shown in FIG. 6, and provides a 16 bit binary number 36, i.e. 4×4, for describing the binary pattern 32. The maximum number of distinct patterns possible for such a window is $2^{16}$ which is equal to 65,536. According to another aspect of the present invention, this figure is reduced to approximately 8,000 unique binary patterns by applying certain symmetry operations, e.g. rotations, reflections. Suitable symmetry operations are known to one skilled in the art.

The operation of the window translation module 16 causes the window 30 to be translated across the binary image 20. To ensure that all of the chromatin strands 6 (FIG. 1) are included in the texture processing, the window 30 is translated over the nuclear region (i.e. binary image 20) in such a way that each of the pixels 22 or 24 (FIG. 4) occupies each of the elements of the window 30 exactly once (FIG. 4). After each translation, the binary number 36 and decimal number equivalent 38 are calculated for the binary pattern 32 translated in the window 30.

Figure 7:
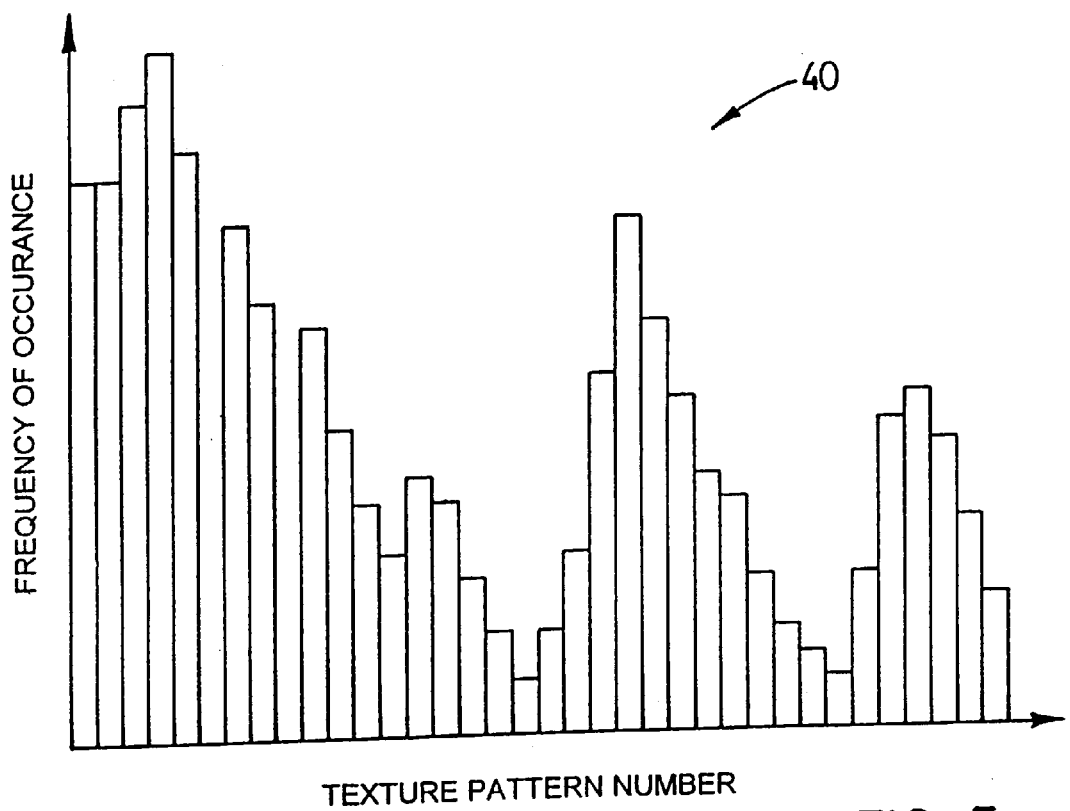
FIG. 7 shows a texture pattern histogram generated according to the window texture extraction method of the present invention.

The histogram tabulation module 18 tabulates the binary numbers 36 (and/or the decimal number equivalents 38) and constructs a texture pattern histogram 40 as shown in FIG. 7. The texture pattern histogram 40 shows the pattern frequency, i.e. the number and type of patterns encountered in the binary image 20. Referring to FIG. 7, the "x" axis represents the texture pattern number and the "y" axis represents the frequency of occurrence for each of the texture patterns processed by the WTE kernel 11.

Figure 8:
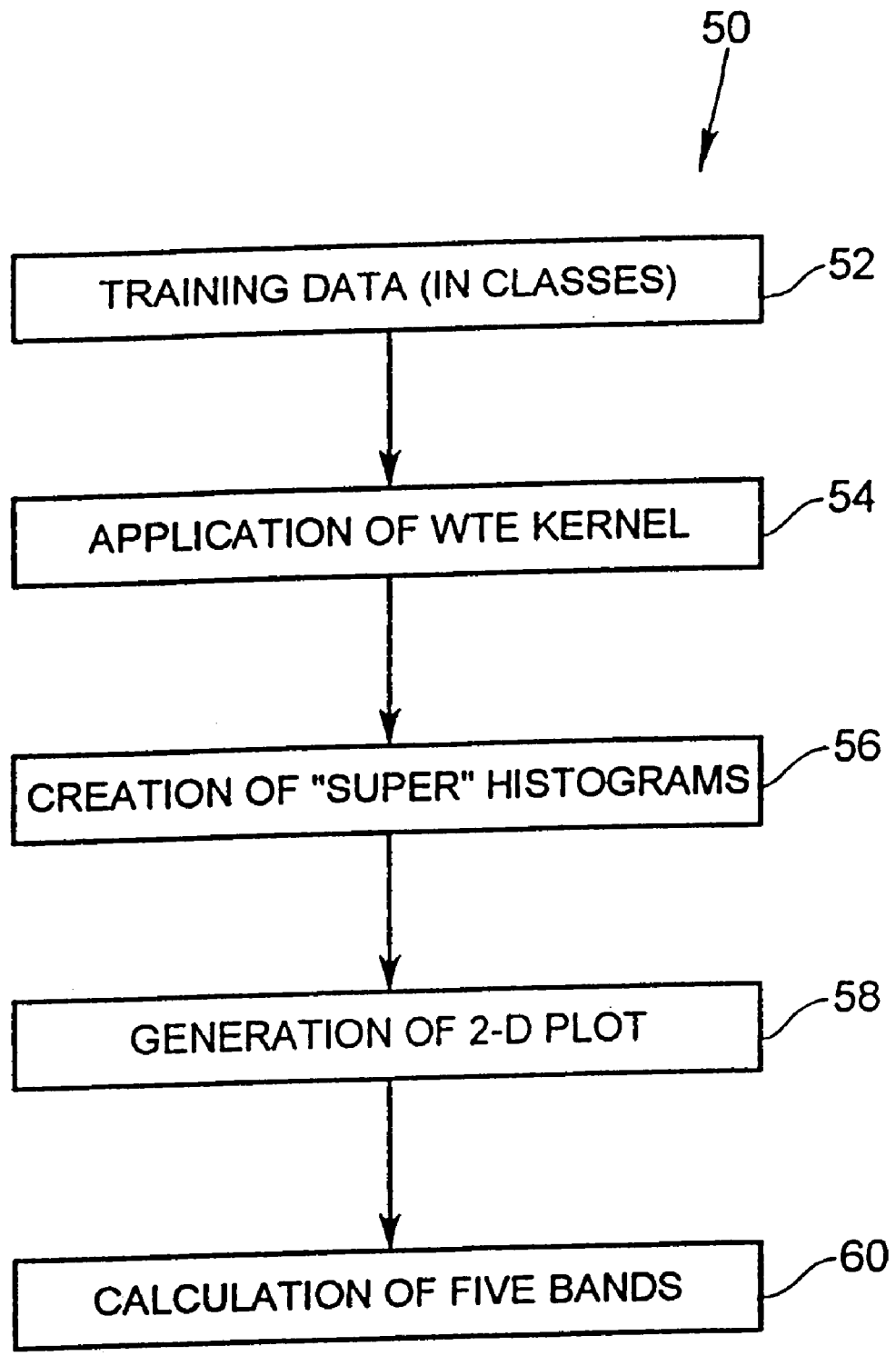
FIG. 8 shows in more detail a previous experiments module in the window texture extraction method according to the present invention.

Before the window texture extraction method 10 can be applied to an image application, "training" data must be compiled. The training data is compiled through a previous experiments process 50 as shown in FIG. 8. The training data comprises previously determined binary patterns each of which is identified with a cell or cellular cluster having known physical and/or chemical characteristics or properties.

The first step in compiling the training data comprises classifying a number of grey-level images of nuclear regions (module 52). The grey-level images are categorized by an expert as either belonging to a classification of interest, designated as set U, or as not belonging to that classification, set U'.

The next step in compiling the training data comprises applying the WTE kernel 11 (FIG. 2) to each of the selected grey-level images (block 54) and also constructing a pattern frequency histogram (similar to the texture pattern histogram shown in FIG. 7) for each image. Next in step 56, a "super" histogram is formed from the texture pattern histograms comprising each category or class, i.e. U and U'. The "super" histogram is made by adding all the pattern frequency-histograms for each class into one single histogram.

Figure 9:
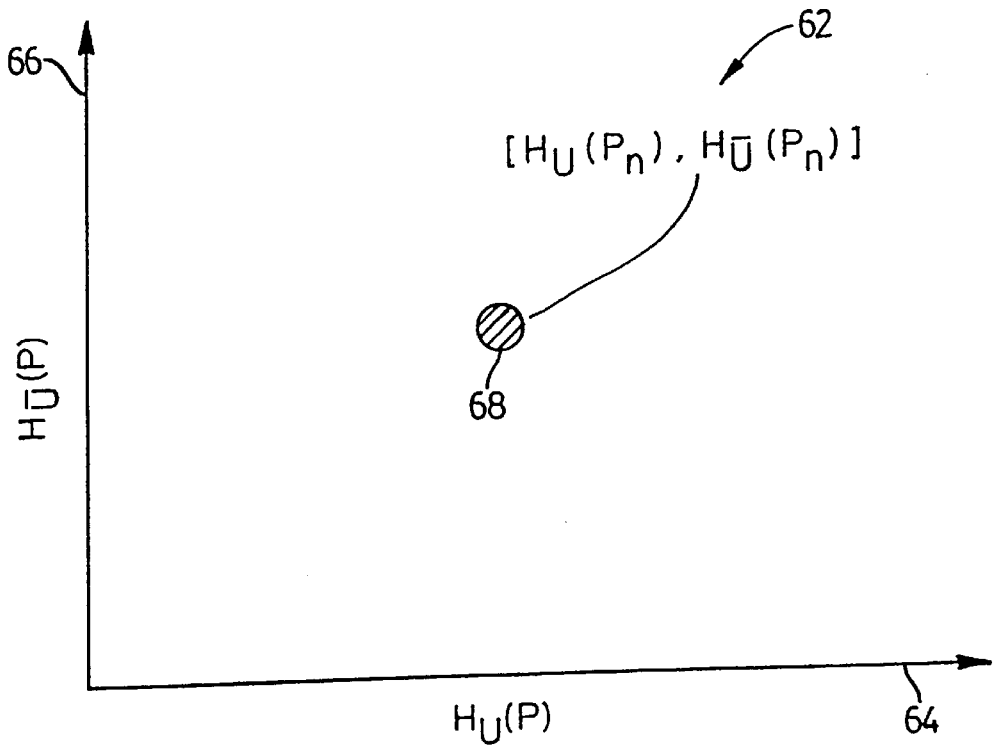
FIG. 9 shows a two-dimensional decision graph which is generated by the previous experiments module of FIG. 8.

According to the invention, the super histograms are used in a classification procedure. The decision to associate a particular binary pattern (e.g. 32b in FIG. 5) with either of the two classes U and U' is made using a two-dimensional plot 62 as shown in FIG. 9. The two-dimensional plot 62 is generated at step 58. Referring to FIG. 9, the graph 62 has one axis 64 which corresponds to the frequency for a binary pattern in the class U histogram, and another axis 66 which corresponds to the frequency for a binary pattern in the class U' histogram. Each unique pattern in the 4×4 window is represented as a point 68 in the two-dimensional graph 62. For the graph 62 shown in FIG. 9, the histogram for the class U is given by the function $H_U(P)$, and the histogram for the class U' is represented by the function $H_{U'}(P)$, where P (e.g. point 68) is the unique binary pattern, i.e. one of approximately 8,000. The points 68 on the two-dimensional graph are determined according to the following relation:

$$[H_U(P), H_{U'}(P)]$$

Figure 10:
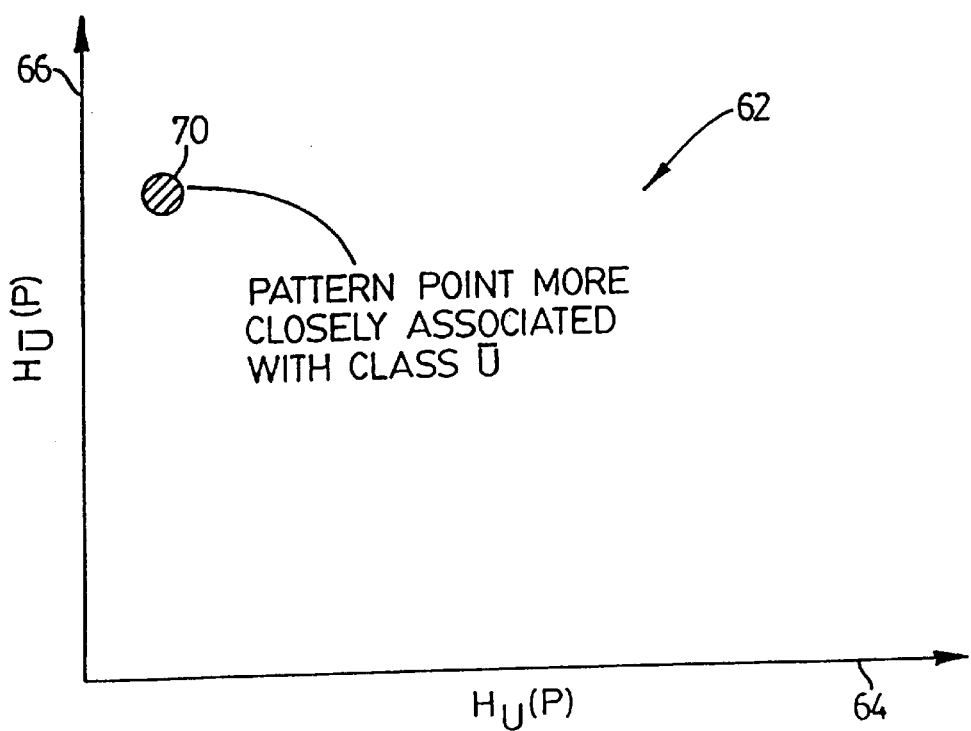
FIG. 10 shows in graphical form a closer pattern point.

It will be understood that the closer a pattern point P is to an axis, the stronger its association with the class corresponding to that axis. For example, the pattern point 70 shown in FIG. 10 is more closely associated with class U', i.e. the pattern point 70 is closer to the U' axis 66 than it is to the U axis 64.

Figure 11:
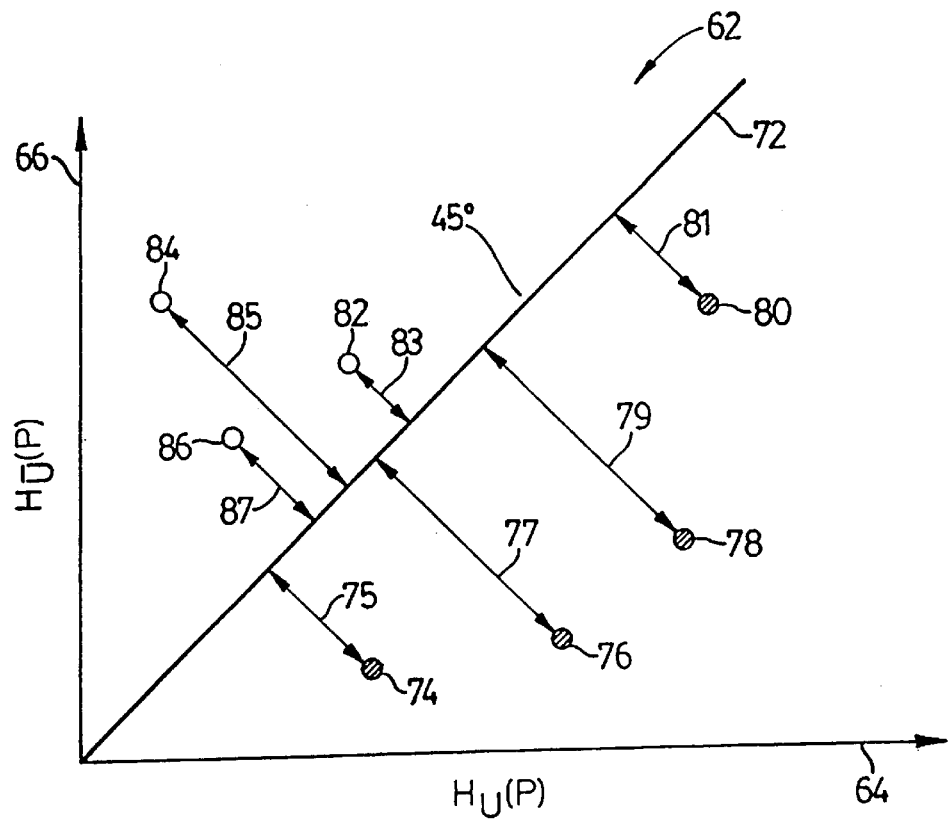
FIG. 11 shows in graphical form a tabulation of each pattern point to produce a decision line.
Figure 12:
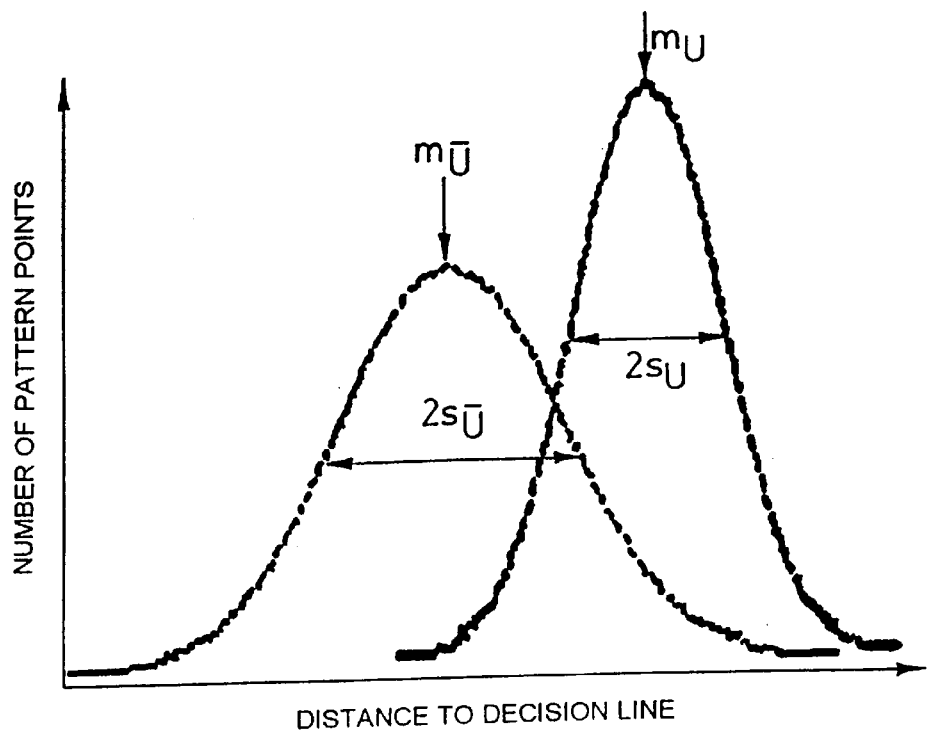
FIG. 12 shows the generation of pattern point distances for each class as statistical distributions according to the method of the present invention.
Figure 13:
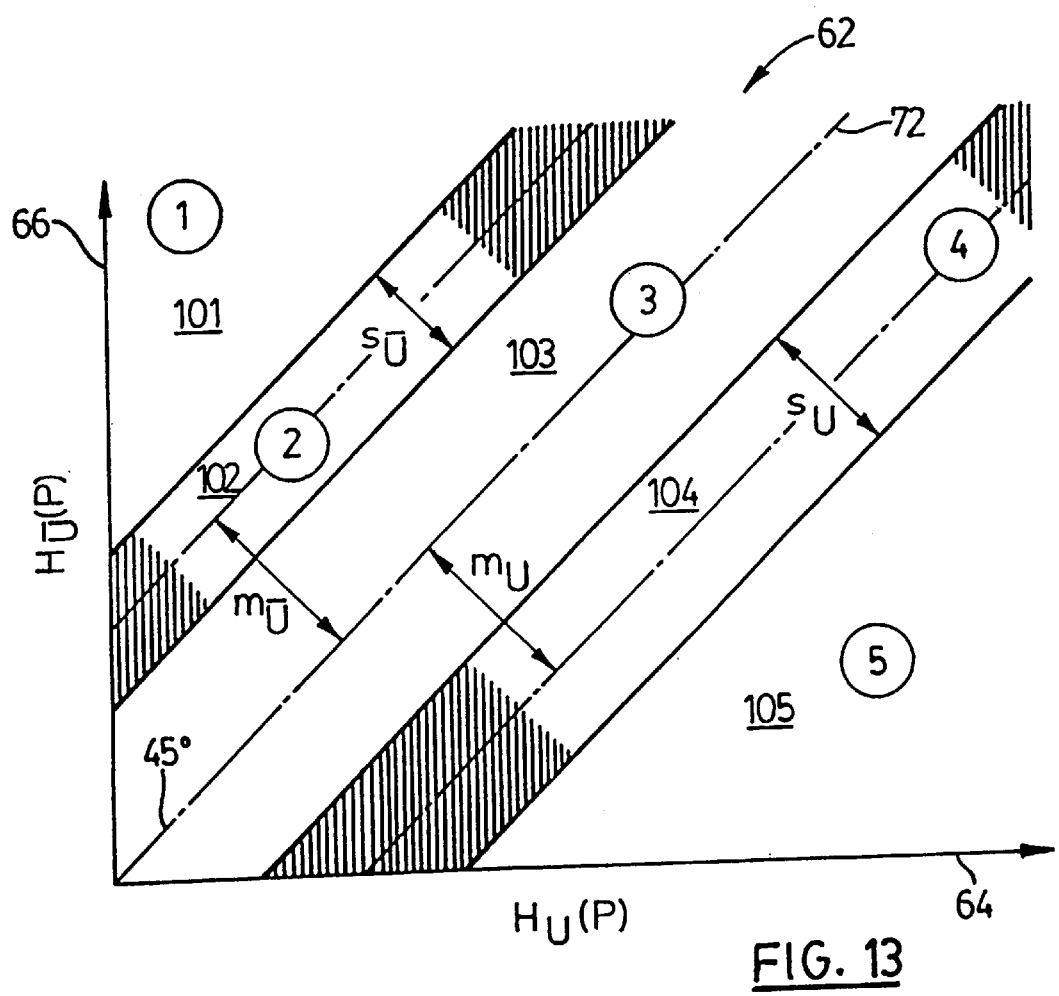
FIG. 13 shows a division of the two-dimensional plot into five bands based on pattern point distance distributions.

Reference is next made to FIG. 11–13 to describe the interpretation and reduction of the number of plotted points in the calculation of five bands in step 60 (FIG. 8). As shown in FIG. 11, the two-dimensional graph 62 includes a 45° diagonal line 72 going through the origin of the two-dimensional graph 62. The diagonal line 72 divides binary pattern points 74, 76, 78, 80 associated with class U from points 82, 84, 86 associated with class U' based on the frequency of occurrence of the points as shown in FIG. 11. The closer a pattern point is to an axis the stronger its association with the class corresponding to that axis. For example, binary pattern point 76 is closely associated with Class U.

Utilizing the general interpretation described, the number of variables required for a classification can be reduced from approximately 8,000 to 5. The reduction procedure according to the invention begins with separate examinations of the pattern points on either side of the 45° diagonal. For each side of the diagonal, a tabulation is made of the distance of those pattern points from the 45° diagonal line 72. In FIG. 11, the distances of the pattern points 74, 76, 78, 80 are represented by arrows 75, 77, 79, 81 as shown, and the distances for the pattern points 82, 84, 86 are represented by arrows 83, 85, 87.

Once the distances of the pattern points with respect to the 45° diagonal line have been tabulated for each side, i.e. class U and class U', each set of distances is characterized by a statistical distribution with a mean and a standard deviation as depicted in FIG. 12. In FIG. 12, the means for Class U and Class U' are represented by $m_U$ and $m_{U'}$, respectively, and the standard deviations for the respective Classes U and U' are given by $S_U$ and $S_{U'}$.

The next operation in the five bands calculation step 60 involves applying the statistical distribution data to the two-dimensional graph 62. Referring to FIG. 13, the two-dimensional graph 62 is divided into five diagonal bands 101, 102, 103, 104, 105 using the means, $m_U$ and $m_{U'}$, and the standard deviations, $S_U$ and $S_{U'}$. As shown in FIG. 13, each band 101 to 105 is given a number 1 through 5, and each pattern point is allocated to one of the five diagonal bands 1–5. The five diagonal bands 1–5 provide classification bands and are utilized to interpret the pattern points as follows:

BAND 1 strongly suggests that the pattern point P (i.e. binary pattern) belongs to category or class U'

BAND 2 weakly suggests pattern point P belongs to category U'

BAND 3 no decision on pattern point P is possible

BAND 4 weakly suggests that pattern point P belongs to category U

BAND 5 strongly suggests that pattern point P belongs to category U

As can be seen, the generation of the five bands produces a classification of the pattern points of either belonging to category U or category U'.

Figure 14:
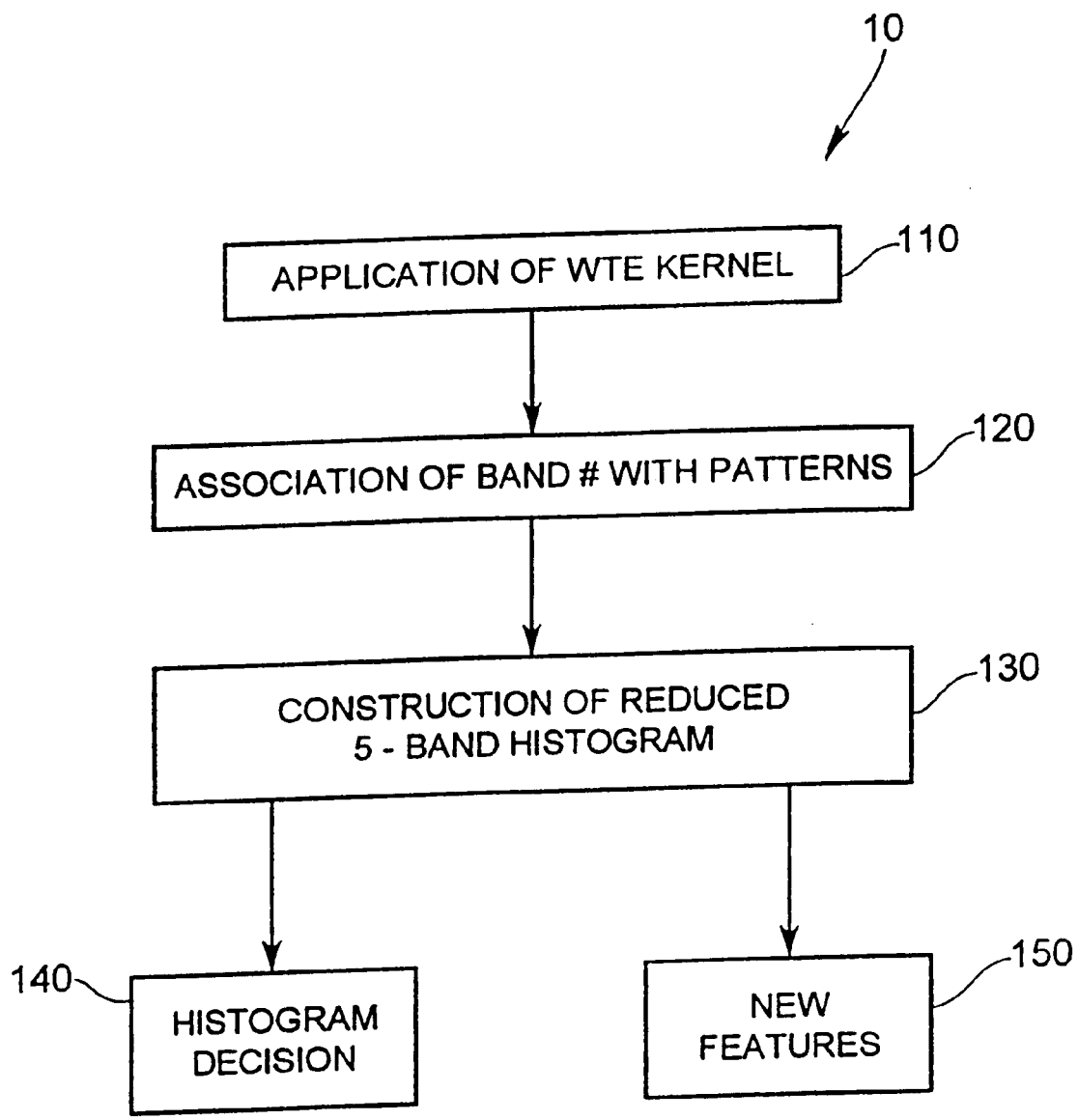
FIG. 14 shows in flow chart form an application of the window texture extraction method according to the present invention.

Reference is next made to FIG. 14, which shows the window texture extraction method 10 being applied to a new digitized image, i.e. a grey-level image of a nuclear region. The first step in the process 10 as indicated by block 110 involves applying the WTE kernel 11 (as described above with reference to FIG. 2) to the digitized image of the nuclear region. The result of the WTE 11 application is a pattern histogram as described above. The next step in block 120 involves associating the five bands 1 to 5 with the pattern points. As described above, the result of the operation in block 120 is the association of the approximately 8,000 patterns with one of the classification bands 1 to 5. The next step in the application of the WTE procedure 10 involves constructing a five-band histogram from the reduced patterns associated with the five classification bands 1–5 (block 130). The frequency of occurrence of each of the classification bands is then analyzed as a histogram in its own right (block 140 in FIG. 14), or the five occurrence frequencies may be interpreted as new features in subsequent classification procedures, as indicated by block 150.

The operation of the window texture extraction process is further described by considering its application to the following two examples: (1) the analysis of single cells; and (2) the analysis of cell clusters.

In the context of single cells, the WTE process is applied to separate two cell types, for example, to distinguish a cervical squamous metaplastic cell from a cervical squamous neoplastic cell, the latter being associated with pre-cancerous lesions of the uterine cervix. To begin the training phase, i.e. previous experiments stage (FIG. 8), a set of grey-level images (preferably several hundred) of each of these two cell types are collected. The WTE kernel 11 (FIG. 2) operations (i.e. edge-enhancement, smoothing and threshold) are applied to convert each cell image into a binary map (FIG. 3). Next, the 4×4 window is applied to each image in turn and a running tally is made of occurrence of each of the 8000 or so possible binary patterns. A two-dimensional graph (FIG. 11) is constructed for each pattern's occurrence for the two categories, cervical squamous metaplastic cells and cervical squamous neoplastic cells. The 5 regional "bands" (FIG. 13) are then applied in order to associate each binary pattern with one of the five diagonal regions. Now, when the image of a new, i.e. unknown, cell is processed by the WTE method (FIG. 14) a 5-band histogram based on these previous identifications is generated. The decision operation (block 140 in FIG. 14) comprises examining the "skewness" of the 5-band histogram to arrive at an identification of the unknown cell. Alternatively, the five numbers can be treated as a new type of mathematical "feature" (for example, optical density, shape, size, etc.) and used in another classification algorithm (e.g. block 150 in FIG. 14) that may confer better performance.

In a similar fashion, the WTE method is applied to separate cells clusters. It will be appreciated that in some cases it is appropriate to treat several cervical cells in close proximity as a unique group of cells. For example, a scrape of the uterine cervix (as part of a Pap test) can often produce traumatically-exfoliated endocervical cells that maintain their intercellular relationships as "sheets" of bound cells. Similarly, endometrial cells can be shed naturally from the endometrial cavity of the uterus in such a way as to preserve physical inter-cellular relationships. By applying the WTE method a separation of these two cellular cluster types is effected. From a medical point of view, separation of these two cell types is desirable because while endocervical cells are to be expected in a Pap test, endometrial cells observed after day 12 of the menstrual cycle are indicative of an endometrial adenocarcinoma.

As described above, the operation of the WTE process begins by collecting images of these cellular clusters, subjecting them to the WTE kernel, tabulating the binary pattern occurrences and finally associating each binary pattern with one of the two categories of cell clusters. Subsequent unknown clusters may then be identified by applying the WTE procedure and evaluating the skewness of the 5-band histogram.

Summarizing, the present invention provides a window texture extraction method which comprises a procedure for quantifying texture features in grey-level images and combining the quantified texture features with previously derived classification results. According to the invention, the previously determined classification results require that all of the training data and all the target data be assigned, or be capable of being assigned to one of two classes. The result is a set of new features that can be quickly analyzed to determine such properties as class membership for identification purposes. In order to fold-in the classification results, the class membership is established in previous experiments on characterized images. The previous experiments are executed through the application of a window texture extraction kernel as shown in FIG. 2.

It is to be understood that the foregoing description of the preferred embodiment of this invention is not intended to be limiting or restricting, and that various rearrangements and modifications which may become apparent to those skilled in the art may be resorted to without departing from the scope of the invention as defined in the appended claims.

What is claimed is:

1. A window texture extraction method for analyzing images of specimens, said method comprising the steps of:
    (a) applying a window texture extraction kernel to said image to identify binary patterns in said image;
    (b) associating each of said binary patterns with a predetermined category;
    (c) constructing a histogram from said predetermined categories;
    (d) utilizing said histogram to evaluate said image.

2. The window texture extraction method as claimed in claim 1, wherein said window texture extraction kernel comprises the steps of:
    (i) applying an edge-enhancement operation to said image to emphasize selected structures in said image;
    (ii) applying a local threshold operation to said edge-enhanced image to generate a binary image wherein said pixels have an ON value or an OFF value;
    (iii) dividing said binary image into a plurality of sub-units and each of said sub-units comprising a predetermined number of binary pixels;
    (iv) converting the binary pixels in each of said sub-units into a numerical identifier wherein said numerical identifier represents a binary pattern formed by said binary pixels in the sub-unit;
    (v) constructing a histogram from said binary patterns wherein said histogram shows pattern frequency.

3. The window texture extraction method as claimed in claim 2, wherein said step of applying a window texture extraction kernel to said image to identify binary patterns in said image includes applying one or more symmetry operations to said binary patterns to produce a reduced number of unique binary patterns for said image.

4. The window texture extraction method as claimed in claim 3, wherein said symmetry operations include rotation and reflection.

5. The window texture extraction method as claimed in claim 3, wherein said step of associating each said binary patterns comprises associating each of the reduced number of binary patterns with one of five classification bands, wherein the first classification band strongly suggests that the binary pattern belongs to a Class U', the second classification band weakly suggests that the binary pattern belongs to the Class U', the third classification band means that no decision on the binary pattern is possible, the fourth classification band weakly suggests that the binary pattern belongs to a Class U, and the fifth classification band strongly suggests that the binary pattern belongs to the Class U.

6. The window texture extraction method as claimed in claim 5, wherein said step of constructing a histogram comprises mapping binary patterns belonging to said five classification bands.

7. The window texture extraction method as claimed in claim 1, further including a training step comprising applying said window texture extraction kernel to a plurality of digitized images of a specimen with known properties and constructing a histogram for binary patterns associated with said specimen.

8. The window texture extraction method as claimed in claim 7 wherein an unknown specimen is evaluated by comparing the histogram constructed in step (c) with the histogram constructed during said training step.

9. A window texture extraction method for identifying patterns in a digitized image, said window texture extraction method comprising the steps of:

(a) applying an edge-enhancement operation to said image to emphasize selected structures in said digitized image and produce an enhanced image;

(b) applying a local threshold operation to said edge-enhanced image to generate a binary image wherein said pixels have an ON value or an OFF value;

(c) dividing said binary image into a plurality of sub-units and each of said sub-units comprising a predetermined number of binary pixels;

(d) converting the binary pixels in each of said sub-units into a numerical identifier wherein said numerical identifier represents a binary pattern formed by said binary pixels in the sub-unit.

10. The window texture extraction method as claimed in claim 9, further including the step of constructing a histogram from said binary patterns wherein said histogram shows the number and types of binary patterns in said digitized image.

* * * * *